(12) United States Patent  
Frenkel

(10) Patent No.: US 7,313,479 B2
(45) Date of Patent: Dec. 25, 2007

(54) METHOD FOR REAL-TIME WELL-SITE INTERPRETATION OF ARRAY RESISTIVITY LOG DATA IN VERTICAL AND DEVIATED WELLS

(75) Inventor: Michael A. Frenkel, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 47 days.

(21) Appl. No.: 11/322,049

(22) Filed: Dec. 29, 2005

(65) Prior Publication Data

US 2006/0173624 A1 Aug. 3, 2006

Related U.S. Application Data

(60) Provisional application No. 60/648,563, filed on Jan. 31, 2005.

(51) Int. Cl.
G01V 3/18 (2006.01)

(52) U.S. Cl. .......................................................... 702/7
(58) Field of Classification Search .................... 702/7
See application file for complete search history.

(56) References Cited

U.S. PATENT DOCUMENTS

| 4,714,889 | A | 12/1987 | Chapman et al. |
| 4,837,517 | A | 6/1989 | Barber |
| 5,157,605 | A | 10/1992 | Chandler et al. |
| 5,452,761 | A | 9/1995 | Beard et al. |
| 5,463,320 | A | 10/1995 | Bonner et al. |
| 5,502,686 | A | 3/1996 | Dory et al. |
| 5,867,806 | A * | 2/1999 | Strickland et al. ............. 702/7 |
| 5,889,729 | A | 3/1999 | Frenkel et al. |
| 6,023,168 | A | 2/2000 | Minerbo |
| 6,060,885 | A | 5/2000 | Tabarovsky et al. |
| 6,064,210 | A | 5/2000 | Sinclair |
| 6,100,696 | A | 8/2000 | Sinclair |
| 6,541,975 | B2 | 4/2003 | Strack |
| 6,553,314 | B2 * | 4/2003 | Kriegshauser et al. ......... 702/7 |
| 6,801,039 | B2 | 10/2004 | Fabris et al. |
| 6,925,384 | B2 * | 8/2005 | Frenkel et al. ................. 702/7 |
| 7,043,370 | B2 * | 5/2006 | Yu et al. ......................... 702/7 |
| 2002/0149997 | A1 * | 10/2002 | Zhang et al. ............... 367/118 |
| 2005/0256644 | A1 | 11/2005 | Xiao ............................. 702/7 |
| 2006/0235619 | A1 | 10/2006 | Yang et al. .................. 702/10 |

OTHER PUBLICATIONS

Barber et al., A Multiarray Induction Tool Optimized For Efficient Wellsite Operation, SPE 30583, presented at the 1995 SPE Annual Technical Conference And Exhibition, Dallas, Texas, Oct. 22-25, 1995, pp. 549-561.

(Continued)

Primary Examiner—Donald E McElheny, Jr.
(74) Attorney, Agent, or Firm—Madan, Mossman & Sriram, P.C.

(57) ABSTRACT

A method and apparatus for real-time well-site interpretation of array resistivity log data. An inversion of data with different depths of investigation is carried out after data shoulder-bed correction. The formation model used by inversion is constructed with the layer boundaries obtained from an imaging tool or other log measurements.

22 Claims, 10 Drawing Sheets

OTHER PUBLICATIONS

Smits et al., High Resolution From A New Laterolog With Azimuthal Imaging, SPE 30584, presented at the 1995 SPE Annual Technical Conference And Exhibition, Dallas, Texas, Oct. 22-25, 1995, pp. 563-576.

Smits et al., Improved Resistivity Interpretation Utilizing A New Array Laterolog Tool And Associated Inversion Processing, SPE 49328, presented at the 1998 SPE Annual Technical Conference And Exhibition, New Orleans, Louisiana, Sep. 27-30, 1998, pp. 831-844.

Zhang et al., Real Time Invenrsion of Array Resistivity Logging Data Using Dimensional Reduction And Neural Netowrk Simulation, SEG 2000 Expanded Abstracts, pp. 1-4.

* cited by examiner

METHOD FOR REAL-TIME WELL-SITE INTERPRETATION OF ARRAY RESISTIVITY LOG DATA IN VERTICAL AND DEVIATED WELLS

CROSS-REFERENCES TO RELATED APPLICATIONS

This application claims priority from U.S. Provisional Patent Application Ser. No. 60/648,563 filed on Jan. 31, 2005.

BACKGROUND OF THE INVENTION

1. Field of the Invention

The invention is related generally to the field of interpretation of measurements made by well logging instruments for the purpose of determining the properties of earth formations. More specifically, the invention is related to a method for determination of formation resistivity using array resistivity data in vertical and deviated wells.

2. Background of the Art

Electromagnetic induction, wave propagation, and galvanic logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction resistivity well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. Nos. 4,837,517; 5,157,605 issued to Chandler et al, and U.S. Pat. No. 5,452,761 issued to Beard et al. Other tools include the HDLL (High Definition Lateral Log) of Baker Hughes Incorporated, described in U.S. Pat. No. 6,060,885 to Tabarovsky et al., and any generic Array Laterolog tools, e.g., the High-Resolution Laterolog Array tool (HRLA) of Schlumberger Inc.

Analysis of measurements made by any array induction logging tool, for example such as that disclosed by Beard and galvanic logging tools such as the HDLL and HRLA or any generic Array Laterolog tools, is based on inversion.

One problem with inversion is that the earth is characterized by a 2-D model (layers with radial changes in resistivity within each layer) or a 3-D model (layers with radial changes in resistivity within each layer, and a relative dip between layers and the borehole). A rigorous 2-D or 3-D inversion techniques would be quite time consuming and impractical for wellsite implementation. See, for example, Mezzatesta et al., and Barber et al. Several methods have been used in the past for speeding up the inversion. Frenkel et al. (SEG Extended Abstracts, 1995; SPE #36505, 1996) and in U.S. Pat. No. 5,889,729 to Frenkel et al., having the same assignee as the present invention and the contents of which are fully incorporated herein by reference disclose a so-called rapid well-site inversion method suitable for well-site (not a real-time) processing of array resistivity data. A rapid inversion method allows for substantially reducing the computational time by subdividing the 2-D/3-D problem into a sequence of smaller 1-D problems. Griffiths et al. (SPWLA 1999, paper DDD) disclose a so-called 1-D+1-D method of well-site (not a real-time) processing of HRLA logs. The processing consists of the following steps: borehole correction, 1-D inversion of individual logs in z direction (shoulder-bed-correction), and 1-D radial inversion of the corrected logs. The main shortcomings of this method are it does not satisfy a real-time processing requirements and it may provide inaccurate results in thin invaded layers due to coupling between shoulder beds and invasion in the adjacent layers. So it leads to significant errors in thin invaded layers. To check the quality and correct inversion results, Griffiths et al. suggest to run a rigorous 2-D inversion which makes this technique is not applicable to even post-acquisition well-site processing.

Prior art methods for real-time well-site interpretation typically perform the 1-D radial inversion on a point by point basis. Shoulder bed effects and borehole deviation effects are not considered. Correction is made only for the invasion effect and could be approximate and lead to incorrect 1-D inversion results even in relatively thick (~5 ft or 1.5 m) invaded formations. In addition, the inversion process may become unstable at layer boundaries, so that significant post inversion processing is often required. This filtering results in a curve of $R_t$ (true formation or virgin zone resistivity) that frequently looks little different from the deep-reading logs of focused curves and produces little additional information. There is a need for a method of real-time well-site inversion of array resistivity measurements that does not suffer from these drawbacks. The present invention addresses this need.

SUMMARY OF THE INVENTION

One embodiment of the present invention is a method of evaluating an earth formation. A plurality of array resistivity logs are obtained using a logging tool conveyed in a borehole in the earth formation. A borehole correction is applied to the array resistivity logs. Each of the corrected logs is represented by steps at approximately determined layer boundaries. An inversion is performed at at least one location between each pair of layer boundaries. The at least one location may be midway between the layer boundaries. The array resistivity logs may include induction measurements and/or galvanic measurements. The measurements may be focused, unfocused or raw measurements. The layer boundaries may be determined using resistivity image data or acoustic image data. The inversion may be done using a neural network or a lookup table. A shoulder bed correction and/or an invasion correction may be applied to each of the array resistivity logs. The inversion may be a constrained inversion. The shoulder bed correction and the invasion correction may be applied iteratively with the inversion. A transition layer may be defined at the layer boundaries.

Another embodiment of the invention is an apparatus for evaluating an earth formation. The apparatus includes a resistivity logging tool conveyed in a borehole in the earth formation which provides a plurality of array resistivity logs indicative of a resistivity of the earth formation. A processor applies a borehole correction to the plurality of array resistivity logs and represents each of the corrected logs by steps at approximately determined layer boundaries. The processor then inverts the logs at at least one location between each pair of layer boundaries. The resistivity logging tool may includ an induction device and/or a galvanic device. The measurements used by the processor may be focused measurements, unfocused measurements and/or raw measurements. The apparatus may include a resistivity imaging device or an acoustic imaging device, the output of the imaging device being used by the processor for determining the layer boundaries. The processor may use a neural net or a table lookup for performing the inversion. The processor may use an invasion resistivity model. The processor may further apply a shoulder bed correction and/or an invasion correction to each of the plurality of array logs. The inversion may be a constrained inversion. The logging tool may be conveyed into the borehole on a wireline, a drilling tubular or a slickline.

Another embodiment of the invention is a machine readable medium that includes instructions enabling the processor to control the data acquisition and process the data. The machine readable medium may include ROMs, EPROMs, EAROMs, Flash Memories and Optical disks.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
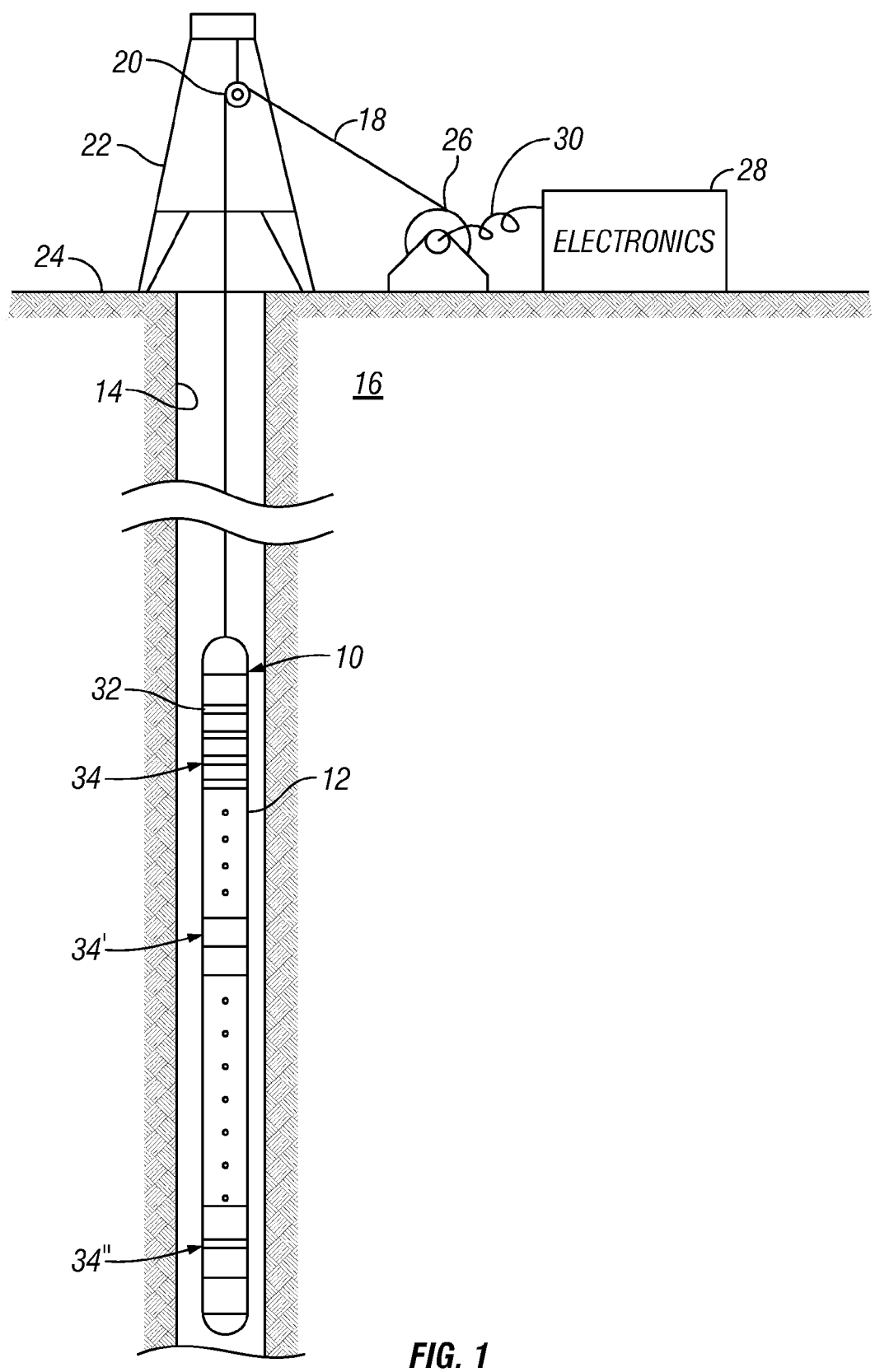
FIG. 1 is a diagram illustrating a wireline logging tool in a borehole.

Referring now to FIG. 1, an exemplary prior art differential array resistivity instrument 10 will be described. Such a configuration has been described in U.S. Pat. No. 6,060,885 to Tabarovsky et al. having the same assignees as the present invention and the contents of which are incorporated herein by reference. The instrument 10 is shown disposed in a borehole 14 penetrating an earth formation 16 and supported by a wire cable 18. The cable 18 is supported and guided by a sheave wheel 20 suspended from a well structure 22 in place on the earth's surface 24 over the wellbore 14. The cable 18 is stored on a cable drum 26 which is controlled at the surface to lower and raise the differential array instrument 12 within the wellbore 14 at a predetermined logging speed. Commands for controlling the operation of the instrument 12 and the data collected by the instrument are transmitted electrically through the cable 18 and via interconnecting cable 30 to an electronics package 28 located at the surface. Alternatively, a downhole processor (not shown) may be used for doing some or all of the processing downhole.

The instrument 10 has an elongated mandrel or body 12, a single source electrode 32 located near the upper end of the instrument housing, and several groups of identical measuring electrodes 34, 34' and 34" uniformly distributed along the axis of the tool mandrel, which allow for performing a number of measurements at each logging depth.

Figure 2:
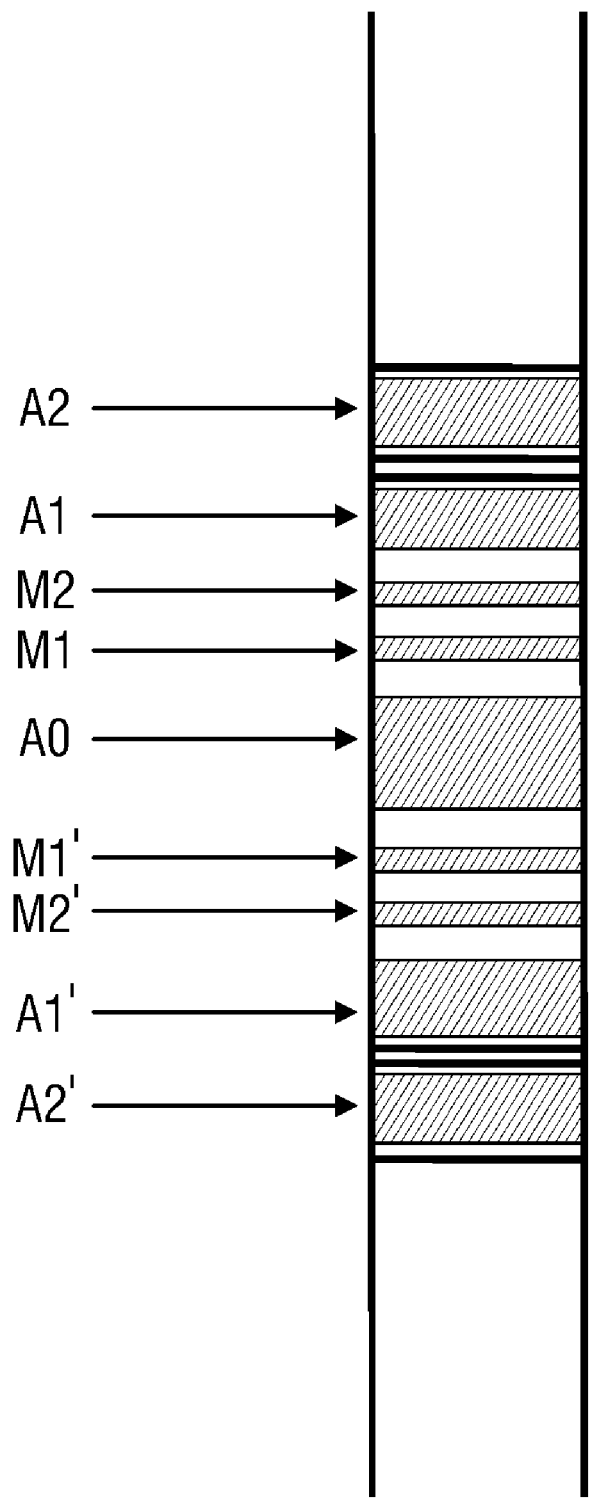
FIG. 2 (Prior art) shows an exemplary generic multi-laterolog array tool suitable for use with the present invention.

The method of the present invention is suitable for processing of data from any array resistivity tool that has as its output apparent resistivity values with different depths of investigation. This includes multi-array induction tools such as the HDIL tool of Baker Hughes Incorporated, and Multi-Laterolog devices, such as those a laterolog array device. Laterolog devices are galvanic instruments which involve the conveyance of electrical currents into the earth formation, in contrast to induction devices in which electrical currents are induced in the earth formation using a suitable transmitter. The apparatus also includes a processor (not shown in FIG. 1) which processes the data as discussed below. An exemplary laterolog device is shown in FIG. 2. The basic configuration consists of a central electrode A0 emitting a survey current with multiple guard electrodes above and below it The electrodes A0, A1, A2, along with their symmetric counterparts A0', A1', A2', serve to emit current into the formation, while monitoring electrodes M1, M2 along with M1', M2' are used to measure potentials. Focusing current is sent between different guard electrodes to achieve greater or less focusing. The greater the focusing, the greater the depth of investigation. As discussed in Smits, three basic measurements are obtained in this way. This hardware focusing is further improved by software focusing, in which the signals from the basic measurements are superimposed mathematically to ensure proper focusing in a wide range of conditions.

Real-time estimation of formation parameters (e.g., $L_{xo}$, $R_{xo}$, $R_t$, etc) is normally carried out at a well-site using 1-D radial inversion of the borehole corrected array data with application of a neural networks (NN) or lookup (LU) tables of the tool responses. See, for example, Smits et al. (SPE49328, 1998) and Zhang et al. (SEG Extended Abstracts 2000). Training neural networks typically involves supervised learning, where each training example contains the values of both the input data and the desired output. As soon as the network is able to perform sufficiently well on additional test cases, it can be used to classify new cases. In computer science, a lookup table is a data structure, usually an array or associative array, used to replace a runtime computation with a simpler lookup operation. The speed gain can be significant, since retrieving a value from memory is often faster than undergoing an expensive computation. Since 1-D radial inversion process is performed on a point-by-point basis, it does not take into account the shoulder bed effect, but corrects the data only for the invasion effect; it could lead to a significant difference between interpretation results and the true formation resistivity in thin invaded formations. This is illustrated with reference to FIGS. 3 and 4.

Figure 3:
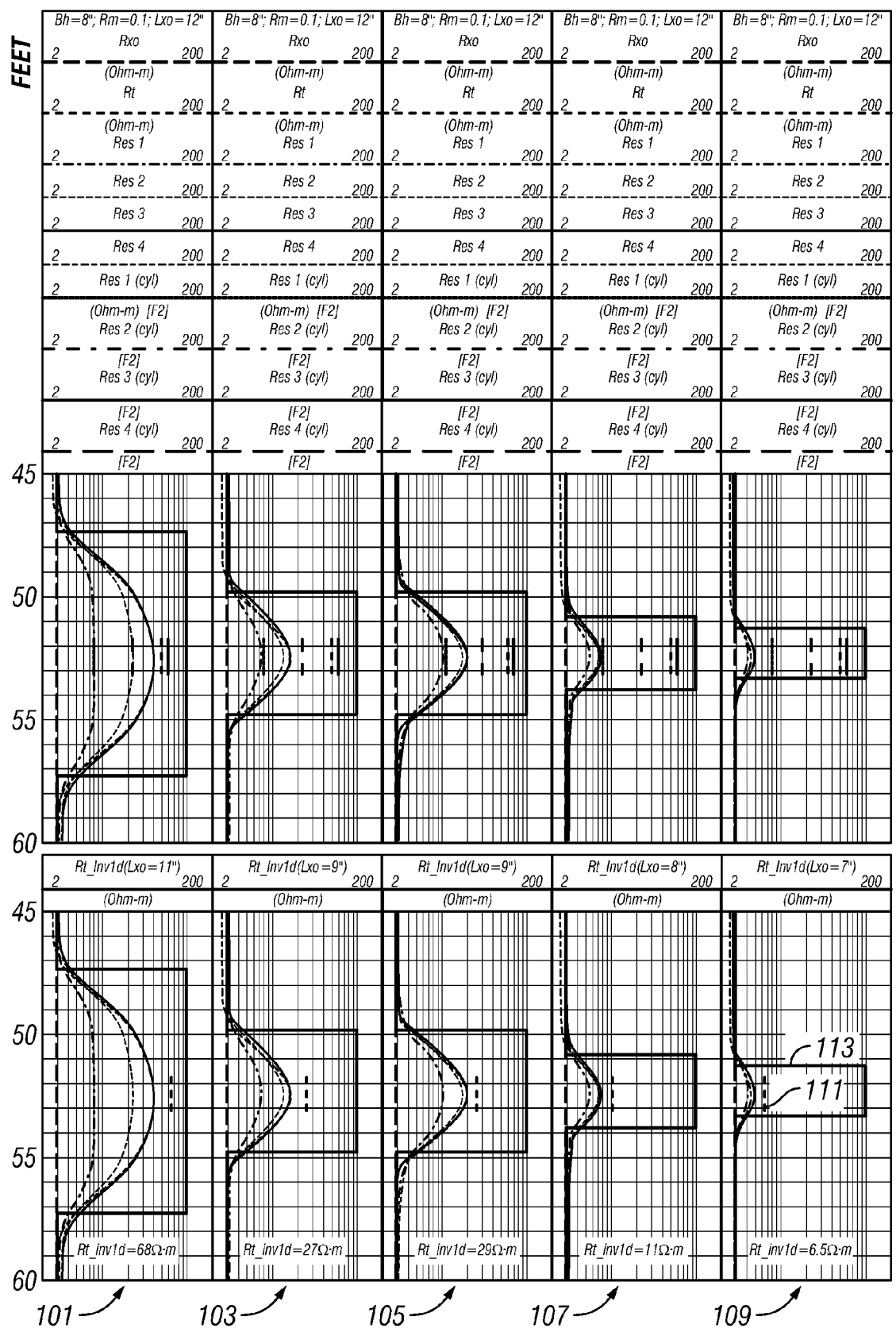
FIG. 3 shows modeling results with the array tool of FIG. 2 for a model than includes an invaded zone of length 12" (top tracks) and the conventional 1-D (point-by-point) radial inversion results for this model (bottom tracks)

FIG. 3 shows 2-D vs 1-D modeling results (top) and 1-D inversion results (bottom) for five different three-layer models ($L_{xo}$=12 in.). In all cases, the $R_{xo}$ is 2 $\Omega$·m and the $R_t$ is 100 Ω·m. The thickness of the middle layer is 10 ft in track 101, 5 ft in tracks 103 and 105, 3 ft in track 107, and 2 ft in track 109. The borehole diameter Bhd is 8 in. in tracks 101, 103, 107, and 109, Bhd=4 in.=tool diameter, in track 105. The curves in the upper portions of the tracks are apparent resistivity measurements at different depths of penetration. $R_t$ recovered by the 1-D inversion is indicated by a dash in the middle of the formation in the bottom portion of the tracks. For example, for track 109, the $R_t$ obtained by 1-D inversion with the known and fixed during inversion value of $R_{xo}$ is denoted by 111 and equal to 6.5 Ω·m. This is significantly lower than the true model value of 100 Ω·m denoted by 113. Similar results are noted in the other tracks as well. In principle, inversion optimization can be done by application of different algorithms. However, in all model cases presented in this invention, the 1-D inversion was done using a Marquardt-Levenberg algorithm.

Figure 4:
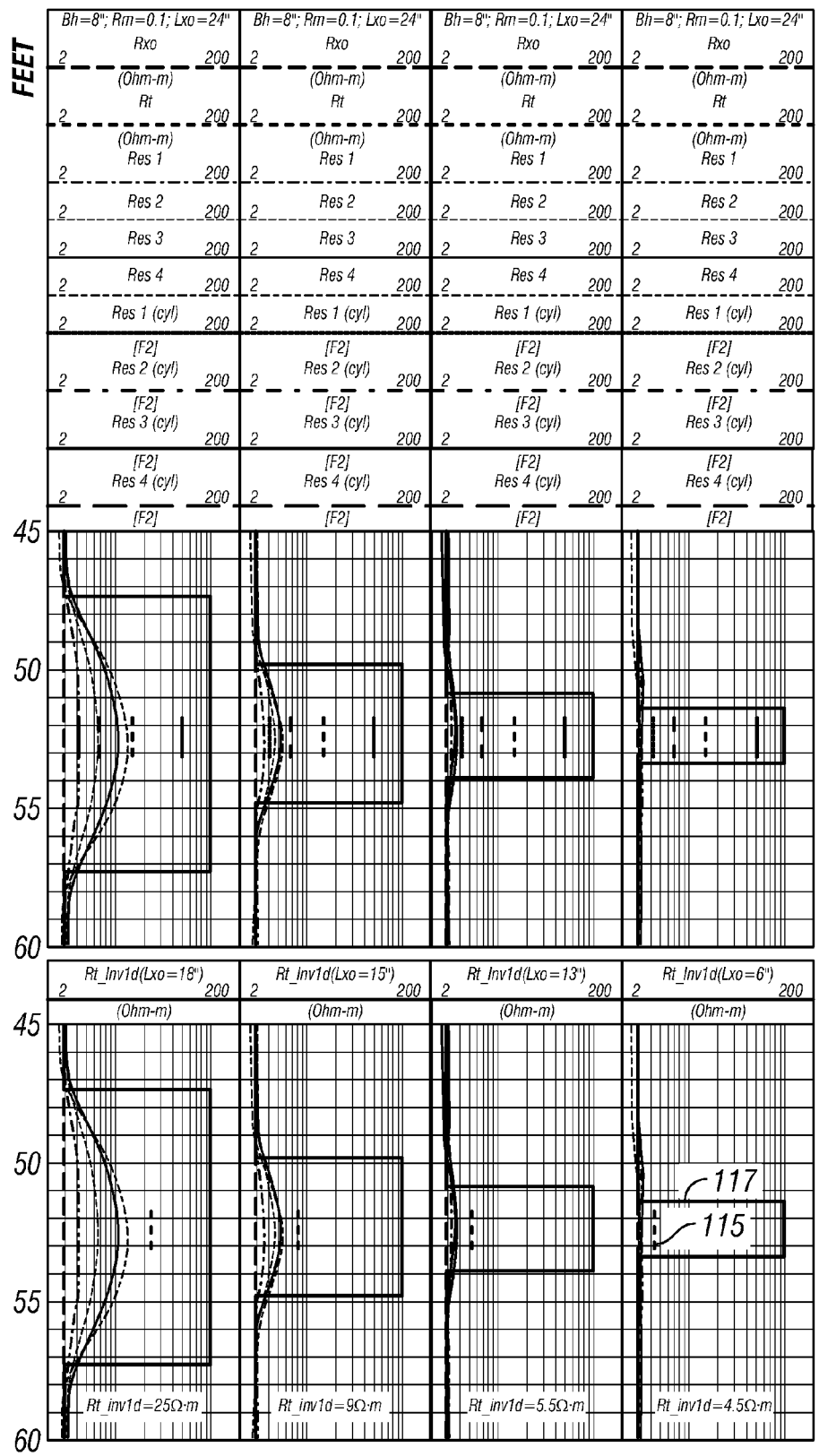
FIG. 4 shows modeling results with the array tool of FIG. 2 for a model that includes an invaded zone of length 24" (top tracks) and the conventional 1-D (point-by-point) radial inversion results for this model (bottom tracks)

FIG. 4 shows similar comparisons of 2-D vs 1-D modeling results (top) and 1-D inversion results (bottom) for three-layer models with a deeper invasion ($L_{xo}$=24 in.). The borehole diameter Bhd is 8 in. in all tracks. The results of the 1-D inversion performed with the known $R_{xo}$ are even smaller than the results obtained for $L_{xo}$=12 in. in FIG. 3. Compare, for example, the inverted value 115 with the actual value 117. The discrepancy between the results of the 1-D inversion and the actual resistivity as seen in FIGS. 3 and 4 are due to strong shoulder-bed and invasion effects.

Figure 8:
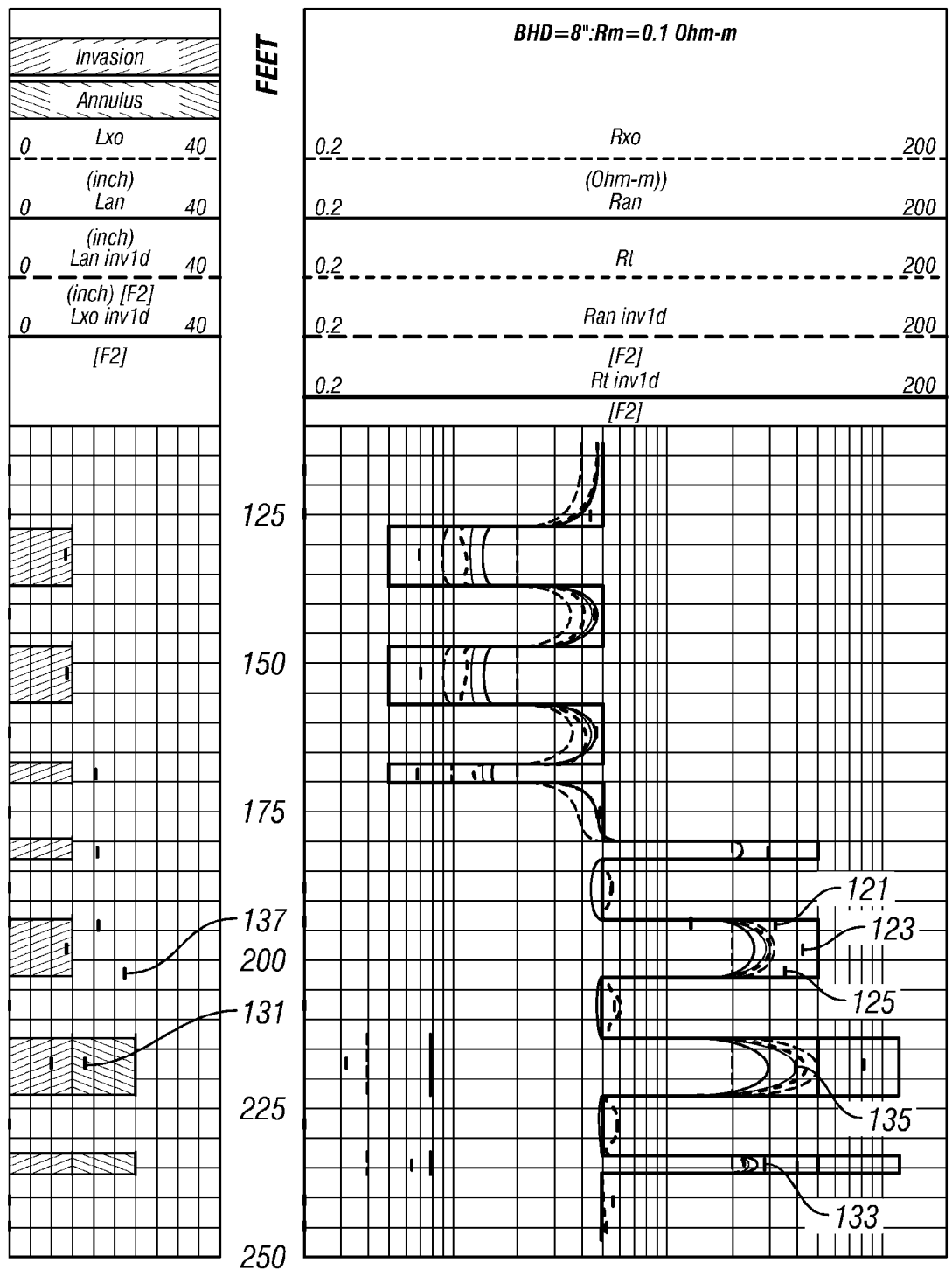
FIG. 8 shows modeling results with the array tool of FIG. 2 for a complex multi-layer benchmark model that includes an annular flushed zone and the results of application of the 1-D radial inversion using the method of FIG. 5.

FIG. 8 shows 2-D modeling and 1-D inversion results for a benchmark model with a complex annulus invasion profile ($L_{zo}$=12 in.; $L_{an}$=12 in.). The annulus zones are present in the layers around 220 ft and 235 ft depth. The results of 1-D inversion give four unknown model parameters ($L_{xo}$, $L_{an}$, $R_{an}$, and $R_t$). We assume that $R_{xo}$ is accurately known from the microresistivity measurements and, therefore, fixed during inversion processing. The results of the inversion are shown by dashes in the figure. In the depth interval from 193 ft-203 ft, the actual values of $R_t$ is denoted by 125. It can be seen that the inverted $L_{xo}$ value 137 at this close to the layer boundary level ~202 ft is quite inaccurate. The result becomes even more inaccurate on the boundary, To produce a reasonable and smooth interpretation curves, post-inversion filtering will be required. However, application of a cosmetic filtering procedure to so inaccurate formation model parameter, cannot be completely eliminated and may propagate to the final inversion results of the adjacent to this point interval producing a completely misleading model parameter values. It can also be seen that the 1-D inversion result gives a value 123 in the middle of the layer than the values 121 and 125 close to the boundary of the layer. It can also be seen that the results in the shales are rather accurate (the shales are the intervals in which the invasion is not present, see the left track).

The sands below 175 ft. all have conductive invasion. It is noted that in the zones with conductive invasion, the estimated $R_t$ is closer to the true $R_t$ in the 10-ft thick layers than in the 3-ft layer. This is in contrast to the upper sands that have resistive invasion wherein the results are similar for the 10-ft and 3-ft layers. The annulus zone parameters are reasonably well estimated by the 1-D inversion—see 131, 133, 135.

To summarize, we conclude that:
(a) inversion results at the middle-layer points are more accurate than ones at the points closer to the layer boundaries;
(b) inaccurate inversion results at the layer boundaries can lead to a very misleading resulting formation model;
(c) results in the shales are quite accurate;
(d) results in the upper section (resistive invasion) are quite similar for both 10-ft and 3-ft layers;
(e) results in the bottom section (conductive invasion) are closer to the true $R_t$ in 10-ft layer than in 3-ft layer; and
(f) annulus zone parameters could be approximately estimated via 1-D inversion.

A test run was performed to estimate computer time requirements for the accurate (enhanced) 2-D inversion execution using the model presented in FIG. 3. Results show that it may take up to several hours to invert a 100-foot of this 15-layer model of the generic Multi-Laterolog data. This indicates that direct application of the 2-D inversion of array data is impractical. To avoid application of time consuming forward modeling programs and deliver more accurate than "straight" 1-D inversion results, the present invention provides for improved 1-D inversion methods suitable for real-time well-site applications.

Figure 5:
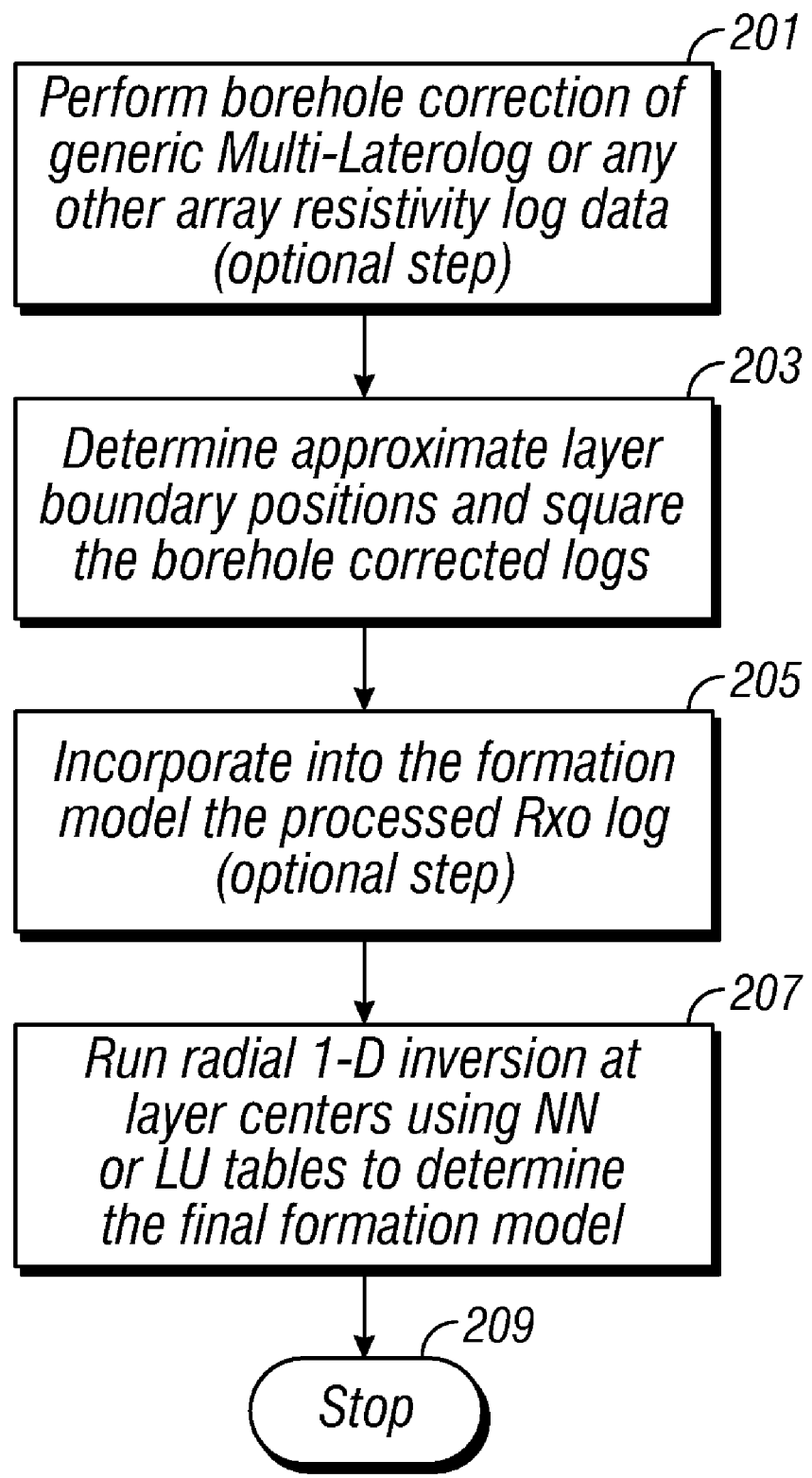
FIG. 5 is a flow chart illustrating one embodiment of the invention.

Based on the above observations, one embodiment of the invention uses a processing sequence illustrated in FIG. 5. Borehole corrections of array resistivity data can be performed 201. However, this step is optional and the method can work with raw uncorrected for borehole effect data (see FIG. 5). As noted above, the method may also be used with multi-array, multi-component induction, or galvanic logs. In addition, the method may also be used with both raw or mathematically (software) focused logs. The main difference with respect to the different types of data lies in the output of the model which, obviously, has to correspond to the data; regardless of the type of data, the model itself has the same structure.

Next, the corrected or raw logs are squared off 203. Methods for doing this "squaring off" are known in the art. The squaring involves representing the logs by discrete steps at bed boundaries. For example, bed boundaries may be identified from image data and constant values are used between the bed boundaries. To determine a better initial model for inversion one embodiment of the invention incorporates a processed $R_{xo}$ log in to inversion process (205) when it is available, however, the method can be executed without an $R_{xo}$ log data. Finally, 1-D radial inversion is run at only one logging point per layer (e.g., formation center data point or averaged several data points around the center point) 207, so the method stops when 1-D inversions executed at each layer (209). The 1-D radial inversion may be done using neural nets (NN) or, alternatively, lookup (LU) tables. Examples of such methods are given in U.S. Pat. No. 5,889,729 to Frenkel et al., having the same assignee as the present invention and the contents of which are fully incorporated herein by reference.

The layers for the model may be defined using an imaging tool such as a resistivity imager and/or an acoustic imager. U.S. Pat. No. 5,502,686 to Dory et al. discloses a tool that produces a composite image from resistivity and acoustic measurements. A suitable imaging tool may be part of the logging string that includes the array resistivity tool such as that of FIG. 2. A device for measuring the resistivity of the mud may also be used. An exemplary device for measuring mud resistivity is discloses in U.S. Pat. No. 6,801,039 to Fabris et al, having the same assignee as the present invention and the contents of which are fully incorporated herein by reference. Fabris teaches an apparatus and method for determination of mud resistivity using defocusing guard electrodes that make the current from current electrodes flow axially through the mud. Caliper measurements (acoustic or mechanical) may also be used in the inversion process. These additional measurements (layer thickness from imaging tools, mud resistivity, borehole diameter, and resistivity of invaded zone, $R_{xo}$) may be used as fixed parameters in the inversion to improve the convergence.

Figure 6:
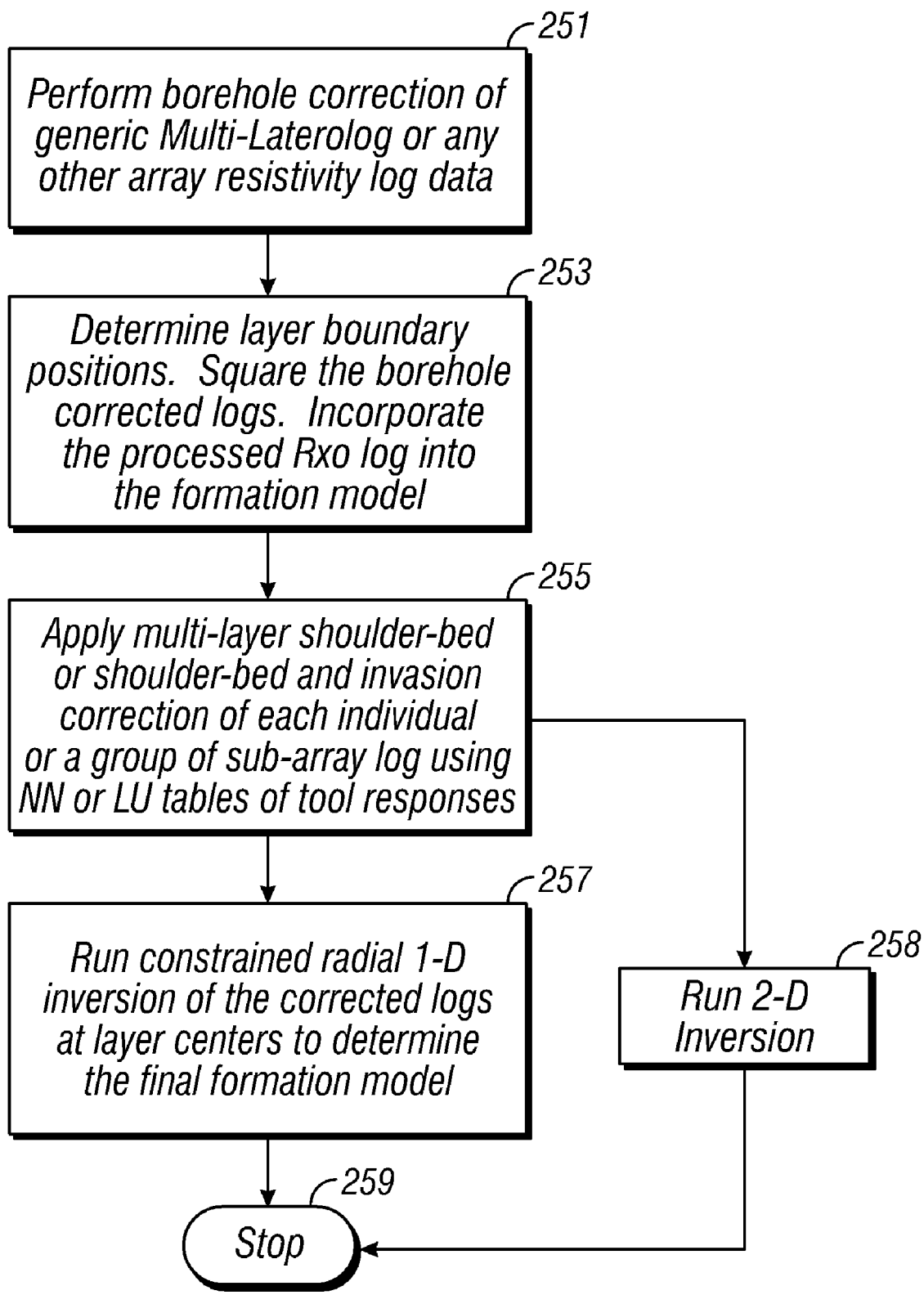
FIG. 6 is a flow chart illustrating a second embodiment of the invention.

Another embodiment of the invention adds additional steps to those in flow chart of FIG. 5 and is depicted in FIG. 6. As before, borehole correction of the array data is performed 251. The layer boundary positions are determined, the borehole corrected logs are squared off and the processed $R_{xo}$ log is incorporated into the model 253. In one embodiment of the invention, transition zones may be defined at the squared-off layer boundaries to reduce noise ininstability of the inversion process. The use of such transition zones is described in U.S. patent application Ser. No. 11/266,537 of Frenkel having the same assignee as the present application and the contents of which are incorporated herein by reference. Then we apply multi-layer-window shoulder-bed or shoulder-bed and invasion correction of each individual sub-array log or a group of sub-array logs using NN or LU tables of tool responses 255. Typically, three or four-layer shoulder bed correction is applied. Next, a constrained or unconstrained radial 1-D inversion of the corrected logs at layer centers is done to determine the final formation model 257. The constraint may be in the form of a mimnax constraint in which maximum changes in the model are minimized. In alternate embodiment of the invention, the 1-D inversion may be done at any point in each of the layers rather than at the centr. The process is then stopped 259. This approach allows us to take into account and correct for both shoulder-bed and invasion effects in the raw measurements and make them ready for a radial 1-D inversion to more accurately determine $L_{xo}$ and $R_t$ in real-time regime. As one can be seen, it is important to use the $R_{xo}$ log (e.g., Microresistivity) in this process. As an alternative to 257, a 2-D inversion over a three-layer-window 258 may be performed using pre-calculated LU tables.

Figure 7:
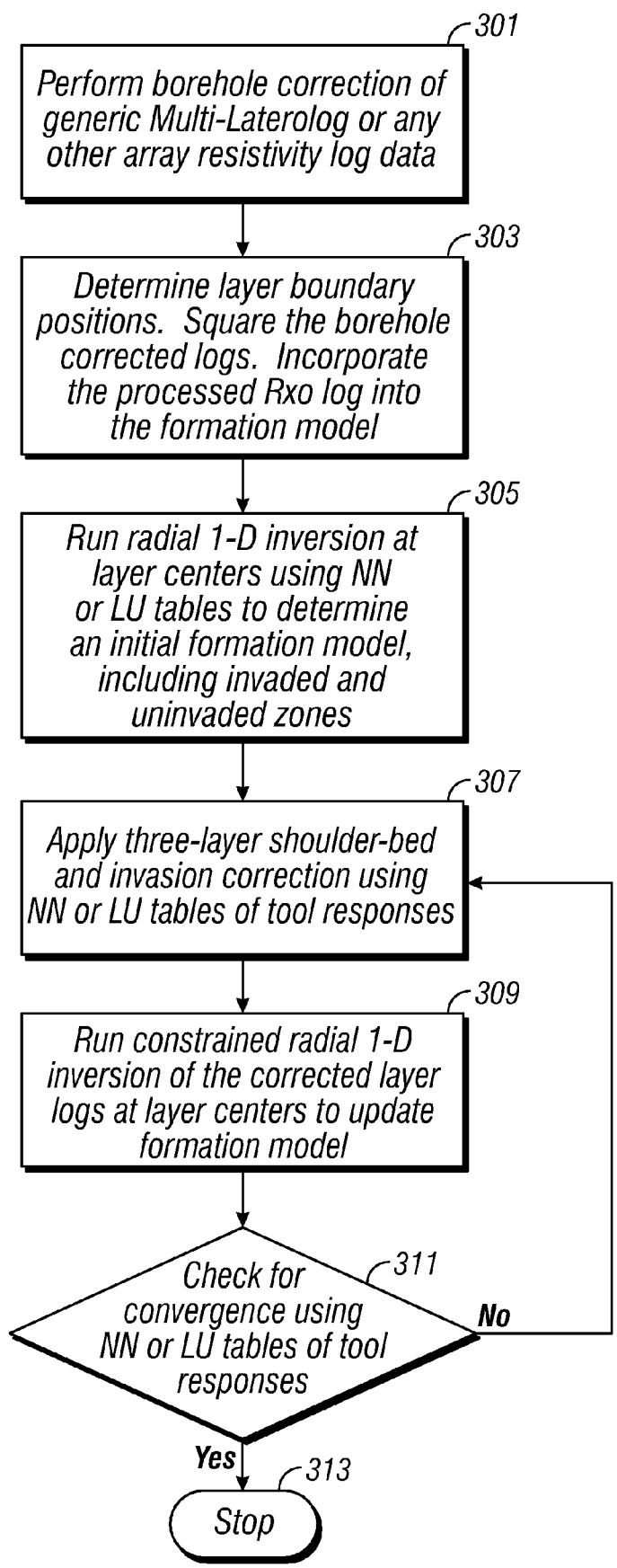
FIG. 7 is a flow chart illustrating a third embodiment of the invention

Another embodiment of the invention adds additional steps to those in flow chart of FIG. 5 and is depicted in FIG. 7. This approach can be named a Localized Rapid Inversion Method. Examples of the Rapid Inversion Methods are given in Frenkel et al. (SPWLA 1997, paper CC) and in U.S. Pat. No. 5,889,729 to Frenkel et al., having the same assignee as the present invention and the contents of which are fully incorporated herein by reference. As before, borehole correction of the Multi-Laterolog focused data is performed 301. As noted above, the method may also be used with multi-array, multi-component induction, or galvanic logs. In addition, the method may also be used with both raw or mathematically (software) focused logs. The main difference with respect to the different types of data lies in the output of the model which, obviously, has to correspond to the data. Next, the borehole corrected logs are squared off 303. optionally, the $R_{xo}$ log may be incorporated into the formation model. Optionally, transition layers may be defined. Next, 1-D radial inversion is run at only one logging point per layer (e.g., formation center data point or averaged data at the center point) 305. The 1-D radial inversion may be done using neural nets or, alternatively, lookup tables. Next, a shoulder bed correction is applied with a multi-layer window at one logging point per layer using lookup tables of the tool responses 307. A constrained radial 1-D inversion is carried at the formation centers 309. A check for convergence is made 311: if a convergence criterion is not satisfied, processing goes back to 307. If convergence is acceptable, then the process stops (313).

Figure 9:
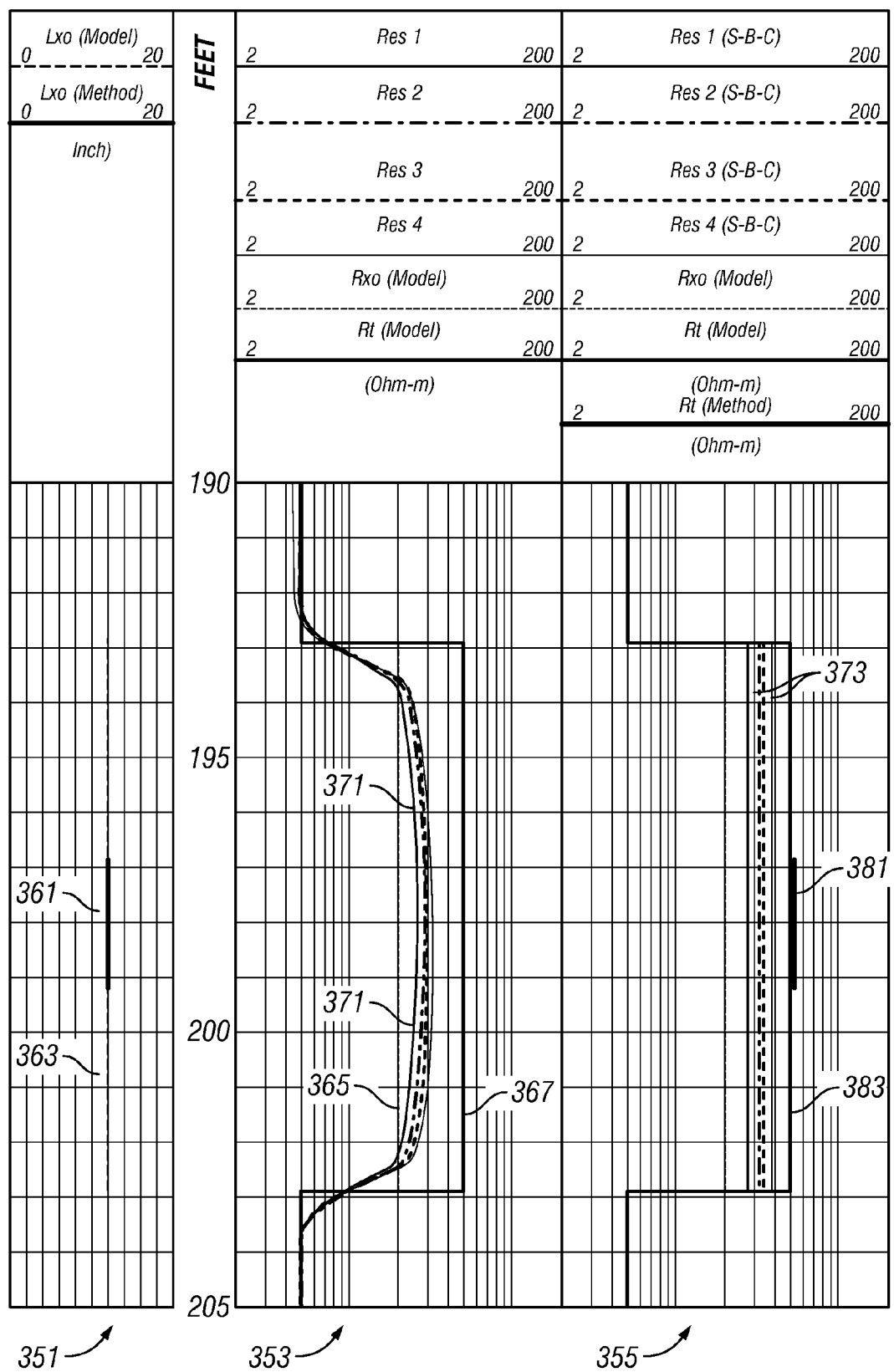
FIG. 9 shows model results for the tool of FIG. 2 and inversion results for a three-layer benchmark model using the method of FIG. 6.

Turning now to FIG. 9, results of using the method discussed above with reference to FIG. 6 are shown. The left track 351 shows the $L_{xo}$ model 361 and $L_{xo}$ derived 363 by the method of the present invention. As can be seen, the agreement is good. Track 2 353 shows the model $R_{xo}$ 365 and the model $R_t$ 365. Track 2 also shows curves of apparent resistivity for four different depths of investigation of the laterolog tool. To simplify the illustration, the curves are collectively labeled as 371 and not individually labeled.

Turning now to track 3 355 (FIG. 9), shown are the shoulder bed corrected apparent resistivities, collectively labeled as 373. The recovered value of $R_t$ in the middle of the layer is denoted by 381 and is in good agreement with the actual value 383 of $R_t$.

Figure 10:
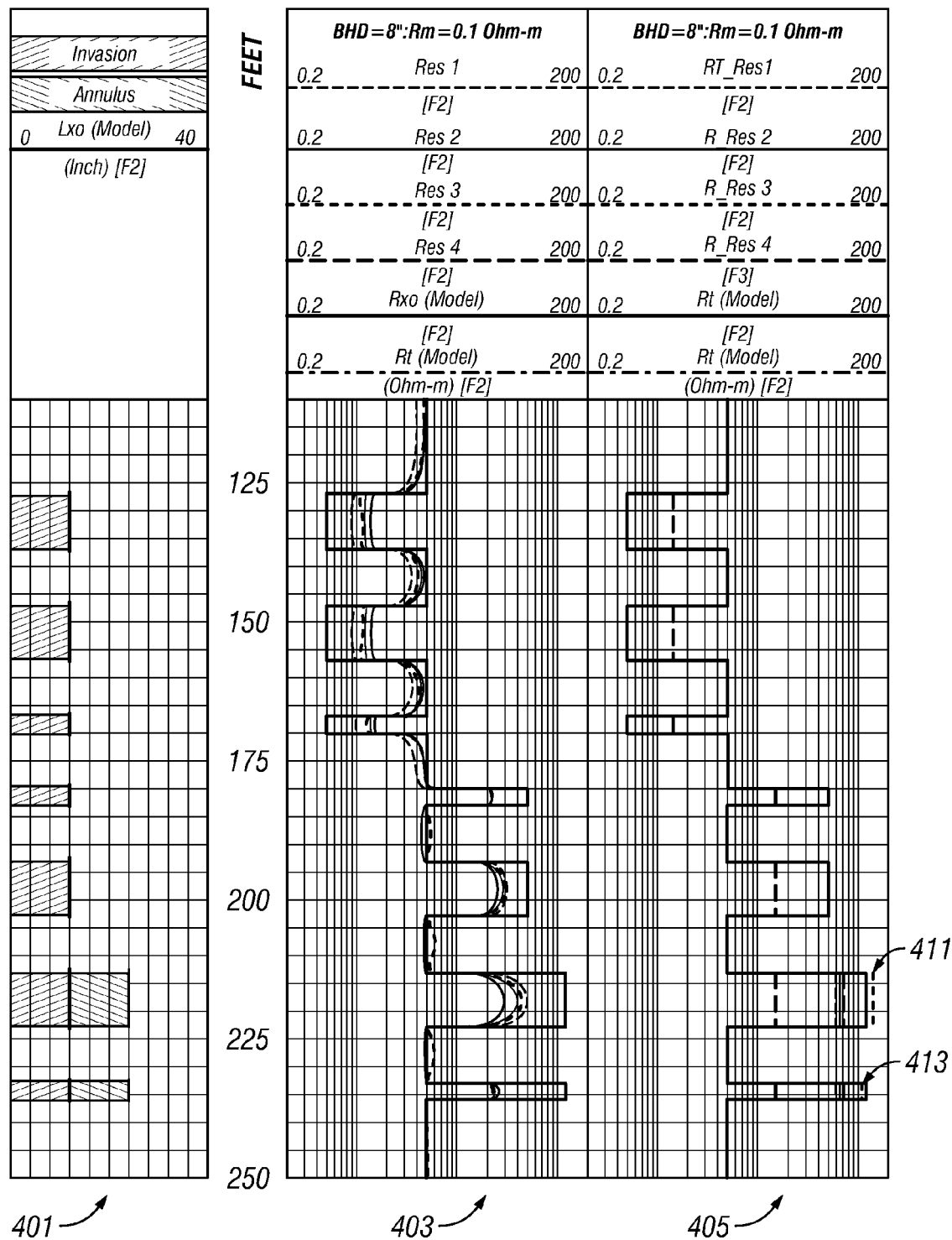
FIG. 10 shows model results for the tool of FIG. 2 and inversion results for the benchmark model presented in FIG. 8 using the method of FIG. 6.

Turning now to FIG. 10, results of using the method discussed above with reference to FIG. 6 are shown. The left track 401 shows the model $L_{xo}$ and the central track 403 shows the model $R_{xo}/R_t$ and Multi-Laterolog data. The right track 405 shows results derived by the method of the present invention. As can be seen, the derived $R_t$ in the bottom two sand layers—vertical lines 411 and 413 are in good agreement with the true values.

The processing of the measurements made by the probe in wireline applications may be done by the surface processor 64 or may be done by a downhole processor (not shown). For MWD applications, the processing may be done by a downhole processor that is part of the BHA. This downhole processing reduces the amount of data that has to be telemetered. Alternatively, some or part of the data may be telemetered to the surface.

The operation of the transmitter and receivers may be controlled by the downhole processor and/or the surface processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

The present invention has been discussed above with respect to measurements made by multi array induction logging tool conveyed on a wireline. This is not intended to be a limitation and the method is equally applicable to 3DEX measurements made using a multicomponent induction logging tool, and to measurements made with tool conveyed on a measurement- and logging-while-drilling (MWD/LWD) assembly conveyed on a drill string or on coiled tubing. The method is also applicable to processing of data obtained by galvanic sensors.

While the foregoing disclosure is directed to specific embodiments of the invention, various modifications will be apparent to those skilled in the art. It is intended that all variations within the scope of the appended claims be embraced by the foregoing disclosure.

The scope of the invention may be better understood with reference to the following definitions:

array resistivity logs: measurements of resistivity (or conductivity) at a number of depths in a borehole using an arrangement or configuration of electrodes or antennas borehole correction: The amount by which a log measurement must be adjusted in order to remove the contribution of the borehole.

coil: one or more turns, possibly circular or cylindrical, of a current-carrying conductor capable of producing a magnetic field;

EAROM: electrically alterable ROM;

EPROM: erasable programmable ROM;

flash memory: a nonvolatile memory that is rewritable;

galvanic: associated with the flow of electrical currents;

induction: the induction of an electromotive force in a circuit by varying the magnetic flux linked with the circuit.

Inversion A mathematical process by which data are used to generate a model that is consistent with the data, the process of solving the inverse problem Lookup (LU) Table: A computer generated table of tool responses to be used by an inversion procedure.

machine readable medium: something on which information may be stored in a form that can be understood by a computer or a processor;

neural network (NN): a computer program that operates in a manner analogous to the natural neural network in the brain.

Optical disk: a disc shaped medium in which optical methods are used for storing and retrieving information;

ROM: Read-only memory.

Shoulder bed correction: The amount by which a log measurement must be adjusted in order to remove the contribution of a layer above or below;

Slickline A thin nonelectric cable used for selective placement and retrieval of wellbore hardware Wireline: electric logging cable including conductor(s).

What is claimed is:

1. A method of determining a resistivity property of an earth formation, the method comprising:
    (a) obtaining a plurality of away resistivity logs using a logging tool conveyed in a borehole in the earth formation;
    (b) applying a borehole correction to the plurality of array resistivity logs and providing corrected logs;
    (c) representing each of the corrected logs by a plurality of steps at approximately determined layer boundaries;
    (d) performing an inversion to one of: (A) the corrected logs, and (B) the array resistivity logs at at least one location between each pair of layer boundaries to provide an estimate of the resistivity property; and
    (e) recording the estimated resistivity property on a suitable medium.

2. The method of claim 1 wherein the at least one location is substantially midway between the layer boundaries.

3. The method of claim 1 wherein the array resistivity logs comprise at least one of (i) induction measurements, and (ii) galvanic measurements.

4. The method of claim 1 wherein the array resistivity logs comprise at least one of: (i) focused measurements, (ii) unfocused measurements, and (iii) raw measurements.

5. The method of claim 1 further comprising determining the layer boundaries using at least one of (i) resistivity image data, and (ii) acoustic image data.

6. The method of claim 1 wherein performing the inversion further comprises using at least one of (i) a neural network, and (ii) a lookup table.

7. The method of claim 1 further comprising using an invasion resistivity model prior to (d).

8. The method of claim 1 further comprising applying at least one of (i) a shoulder bed correction, and (ii) an invasion correction, to each of the plurality of array logs.

9. The method of claim 1 wherein the inversion comprises a constrained inversion.

10. The method of claim 8 further comprising iteratively repeating the application of the shoulder bed correction and invasion correction, and the constrained inversion until a convergence test is satisfied.

11. The method of claim 1 further comprising defining a transition layer associated with at least one of the approximately determined layer boundaries.

12. An apparatus for determining a resistivity property of an earth formation, the apparatus comprising:
    (a) a resistivity logging tool configured to be conveyed in a borehole and provide a plurality of array resistivity logs indicative of the resistivity property of the earth formation; and
    (b) a processor configured to:
        (A) apply a borehole correction to the plurality of array resistivity logs and provide borehole coffected logs;
        (B) represent each of the corrected logs by a plurality of steps at approximately determined layer boundaries;
        (C) perform an inversion of one of: (I) the corrected logs, and (II) the array logs at at least one location between each pair of the layer boundaries and provide an estimate of the resistivity property; and
        (D) record the estimated resistivity property on a suitable medium.

13. The apparatus of claim 12 wherein the resistivity logging tool is selected from the group consisting of (i) an induction device, and (ii) a galvanic device.

14. The apparatus of claim 12 wherein the away resistivity logs comprise at least one of: (i) focused measurements, (ii) unfocused measurements, and (iii) raw measurements.

15. The apparatus of claim 12 further comprising an imaging device selected from: (i) a resistivity imaging device, and (ii) an acoustic imaging device, the imaging device configured to produce an image of the borehole, and wherein the processor is further configured to use an output of the imaging device for determining the layer boundaries.

16. The apparatus of claim 12 wherein the processor comprises at least one of: (i) a neural network, and (ii) a table lookup configured to perform the inversion.

17. The apparatus of claim 12 wherein the processor is further configured to use an invasion resistivity model prior to (C).

18. The apparatus of claim 17 wherein the processor is further configured to apply at least one of: (i) a shoulder bed correction, and (ii) an invasion correction, to each of the plurality of array logs.

19. The apparatus of claim 17 wherein the inversion comprises a constrained inversion.

20. The apparatus of claim 12 further comprising a conveyance device configured to convey the logging tool into the borehole, the conveyance device selected from the group consisting of: (i) a wireline, (ii) a drilling tubular, and (iii) a slickline.

21. A computer readable medium for use with an apparatus for determining a resistivity property of an earth formation, the apparatus comprising:
    (a) a resistivity logging tool configured to be conveyed in a borehole and provide a plurality of array resistivity logs indicative of the resistivity property of the earth formation;
    the medium comprising instructions which enable a processor to:
    (b) apply a borehole correction to the plurality of array resistivity logs and provide borehole corrected logs;
    (c) represent each of the corrected logs by a plurality of steps at approximately determined layer boundaries;
    (d) perform an inversion of one of: (i) the borehole corrected logs, and (ii) the array logs at locations at at least one location between each pair of layer boundaries and provide an estimate of the resistivity property; and
    (e) record the estimate on a suitable medium.

22. The medium of claim 21 further comprising at least one of (i) a ROM, (ii) an EPROM, (iii) an EAROM, (iv) a flash memory, and (v) an optical disk.

* * * * *